United States Patent [19]

Walliker

[11] Patent Number: 5,000,084
[45] Date of Patent: Mar. 19, 1991

[54] BAKING APPLIANCE

[76] Inventor: Graeme I. K. Walliker, 4 Virginia Place, West Pennant Hills, N.S.W., 2120, Australia

[21] Appl. No.: 362,450
[22] PCT Filed: Nov. 26, 1987
[86] PCT No.: PCT/AU87/00397
 § 371 Date: May 23, 1989
 § 102(e) Date: May 23, 1989
[87] PCT Pub. No.: WO88/03757
 PCT Pub. Date: Jun. 2, 1988

[30] Foreign Application Priority Data
Nov. 27, 1986 [AU] Australia .............. PH9186

[51] Int. Cl.$^5$ .............. A23P 1/00; A23L 1/10; A47J 37/01
[52] U.S. Cl. .............. 99/354; 99/353; 99/442; 426/279; 426/280
[58] Field of Search .......... 99/354, 353, 442; 426/138, 143, 279, 280, 499

[56] References Cited

U.S. PATENT DOCUMENTS

| 1,417,757 | 5/1922 | McLaren | 99/372 |
| 1,420,378 | 6/1922 | Inghram | 99/373 |
| 1,510,279 | 9/1924 | Huth et al. | 99/439 |
| 1,708,899 | 4/1929 | Roberts | 99/383 |
| 1,906,640 | 5/1933 | Shivek | 425/438 |
| 1,936,835 | 11/1933 | Fairchild | 426/138 |
| 1,974,204 | 9/1934 | Cooter | 99/383 |
| 1,979,429 | 11/1934 | Wilkes et al. | 99/430 |
| 2,078,102 | 4/1937 | Siela | 99/439 |
| 2,346,628 | 4/1944 | Todd | 99/442 |
| 3,158,087 | 11/1964 | Hedglin | 99/428 |
| 3,290,154 | 12/1966 | Turner | 426/138 |
| 3,341,167 | 9/1967 | Weiss | 99/439 |
| 3,541,587 | 11/1970 | Washburn | 426/138 |
| 4,214,517 | 7/1980 | Caldwell | 426/138 |
| 4,241,649 | 12/1980 | Nelson et al. | 99/442 |
| 4,251,554 | 2/1981 | Baisden | 426/138 |
| 4,725,444 | 2/1988 | Wilkins | 426/138 |

FOREIGN PATENT DOCUMENTS

| 78631 | 2/1932 | Australia . |
| 166647 | 2/1955 | Australia . |
| 266682 | 9/1963 | Australia . |
| 268965 | 1/1965 | Australia . |
| 494381 | 12/1976 | Australia . |
| WO8301726 | 5/1983 | PCT Int'l Appl. . |

Primary Examiner—Marianne Cintins
Assistant Examiner—D. Workman
Attorney, Agent, or Firm—Volpe and Koenig

[57] ABSTRACT

A baking apparatus with a plurality of spaced-apart female molds, and a co-acting top tray provided with and equal plurality of hollow spikes adapted to extend downwardly into the female molds which produce an elongated cavity in a bread roll baked in the apparatus. The distance between the lower end of each spike and the lower end of an associated female mold is greater than the distance between the interior wall of the mold and outer wall of the spike with the first longitudinal cross-section of said female mold rounded at the closed end thereof and the second longitudinal cross-section, in a plane normal to the first longitudinal cross-section, is conical at the closed end.

6 Claims, 2 Drawing Sheets

U.S. Patent   Mar. 19, 1991   Sheet 1 of 2   5,000,084
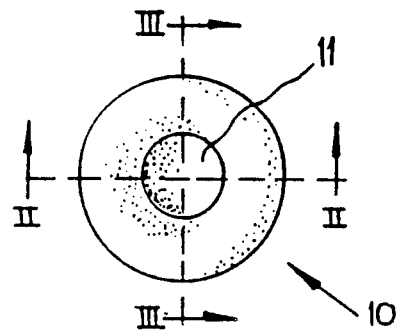
-FIG. 1-
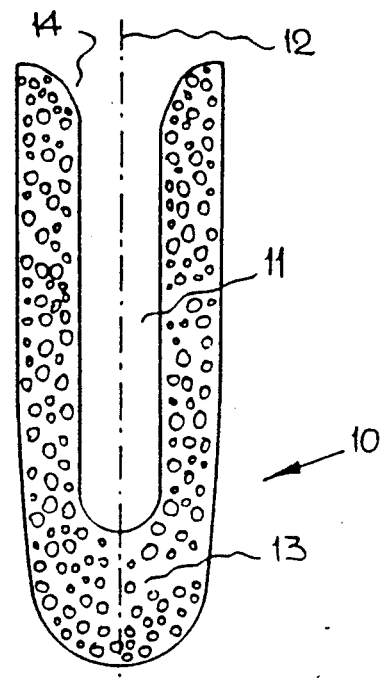
-FIG. 2-
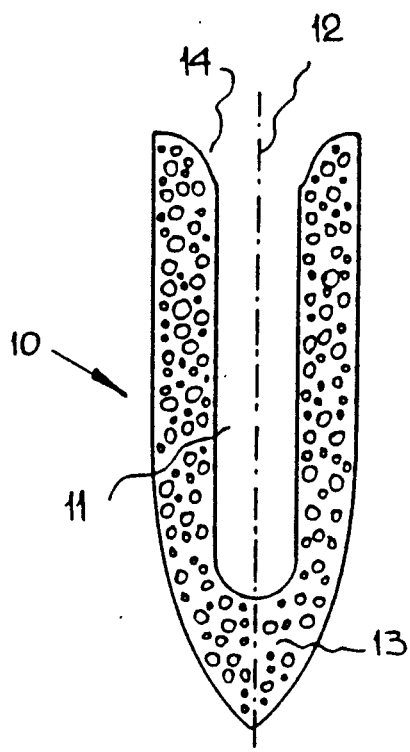
-FIG. 3-
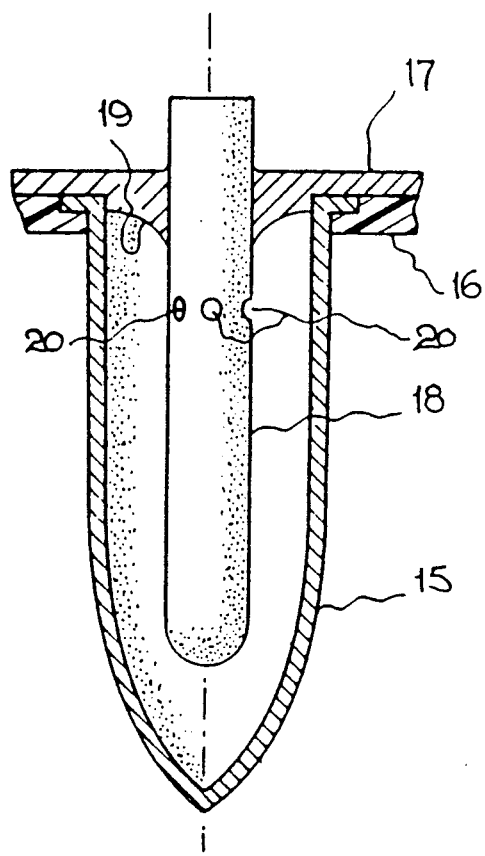
-FIG. 4-

BAKING APPLIANCE

TECHNICAL FIELD

This invention relates to bread rolls and more particularly to a bread roll provided with a molded-in longitudinal cavity down its centre, into which may be inserted a sausage such as a frankfurt, saveloy, kransky, or the like. In a second aspect, the invention also consists in specialized baking equipment for the baking of molded, cavitied bread rolls.

BACKGROUND ART

Conventional elongate bread rolls for the preparing of so-called "hot dogs" are generally slit lengthwise to permit placing therein of the frankfurt, etc., or, less commonly, impaled on a metal spike to produce an elongate cavity into which the selected sausage can be inserted.

It has previously been proposed to bake so-called edible food containers and to provide appropriate utensils in which to bake them. For example PCT Application WO 83/01726, to Locolas et al, discloses a means of manufacturing an edible food container in the shape of a trucated cone, as does also the edible baked cup-shaped produce disclosed in U.S. Pat. No. 3,290,154, to Turner. Both these edible containers have conical interior cavities, or blind "chimneys", and flat tops and bottoms.

U.S. Pat. No. 1,974,204, to Cooter, discloses an apparatus for baking hollow bread rolls, consisting of a pair of hinged mold plates with descrete heating elements and pocket forming core pieces.

U.S. Pat. No. 3,341,167, to Weiss, also discloses apparatus for baking hollow bread rolls. A hollow core element is located along the bottom of a fin attached to a top mold plate. The core element has in it apertures through which air under pressure can pass to free the roll from the top mold plate after baking.

U.S. Pat. No. 3,158,087, to Hedglin, discloses a baking tray for baking a number of hollow bread rolls, core elements pivoting on an upper frame.

The following patent specifications are also considered to be of at least some interest: U.S. Pat. Nos. 1,510,279(Woods); 1,936,835 (Fairchild); 1,950,772 (Biggs); 1,979,429 (Werner); 2,078,102 (Siela) and 4,214,517 (Caldwell).

DISCLOSURE OF INVENTION

The present invention is concerned with the premolding of dough mix prior to baking to produce an improved cavitied bread roll. Another object of the invention is to provide a hot dog or the like not necessarily requiring to be wrapped or placed in an outer bag at the point of sale.

It is a further object of the present invention to provide what may be termed a multi-purpose bread roll adapted to be sold from a so-called "fast-food" outlet as, for example, in a hamburger shop conventionally selling hamburgers only, to thereby use the inventive bread rolls to provide a range of foods of greater variety than previously offered.

The above and other objects are able to be achieved by the provision of a baked roll having an elongate, preferably round-bottomed cavity extending partially along its longitudinal axis, an end thereof, located remote from the mouth of said elongate cavity, being baked to a greater extent than is the remainder of the bread roll to thus form a crusty bottom end adapted to absorb and retain flavourings and/or various sauces, as will be enumerated hereinafter. Preferably the top end of the bread roll is formed with a will or depression which is concentric with the elongated cavity, the outer edges of the top being rounded. The lower, closed end of the bread roll, however, is not uniformly concentric with the elongate cavity, nor is it concentric about its periphery.

Ideally, the outer wall of the bread roll itself, and the inner wall of the cavity therein are baked so as to form crusty surfaces.

In the second aspect of the present invention, a baking appliance for the baking of the cavitied bread rolls comprises a lower tray having therein a spaced-apart plurality of "female" molds; and also a co-acting top or cover provided with an equal plurality of hollow spikes, or lances, or fingers, each one being adapted to extend downwardly into a mold, so as to thereby produce an elongated cavity in a bread roll baked in the said appliance.

BRIEF DESCRIPTION OF DRAWINGS

In order that a better understanding of the invention may be gained, hereinafter is described a preferred embodiment thereof, by way of example only and with reference to the accompanying drawings in which:

FIG. 1 is a top plane view of a bread roll according to the present invention;

FIG. 2 is a longitudinal cross-section along line II—II of FIG. 1;

FIG. 3 is a longitudinal cross-section along line III-—III of FIG. 1;

FIG. 4 shows a vertical cross-section through a typical cup-and-finger arrangement.

BEST MODE FOR CARRYING OUT THE INVENTION

Figure 5:
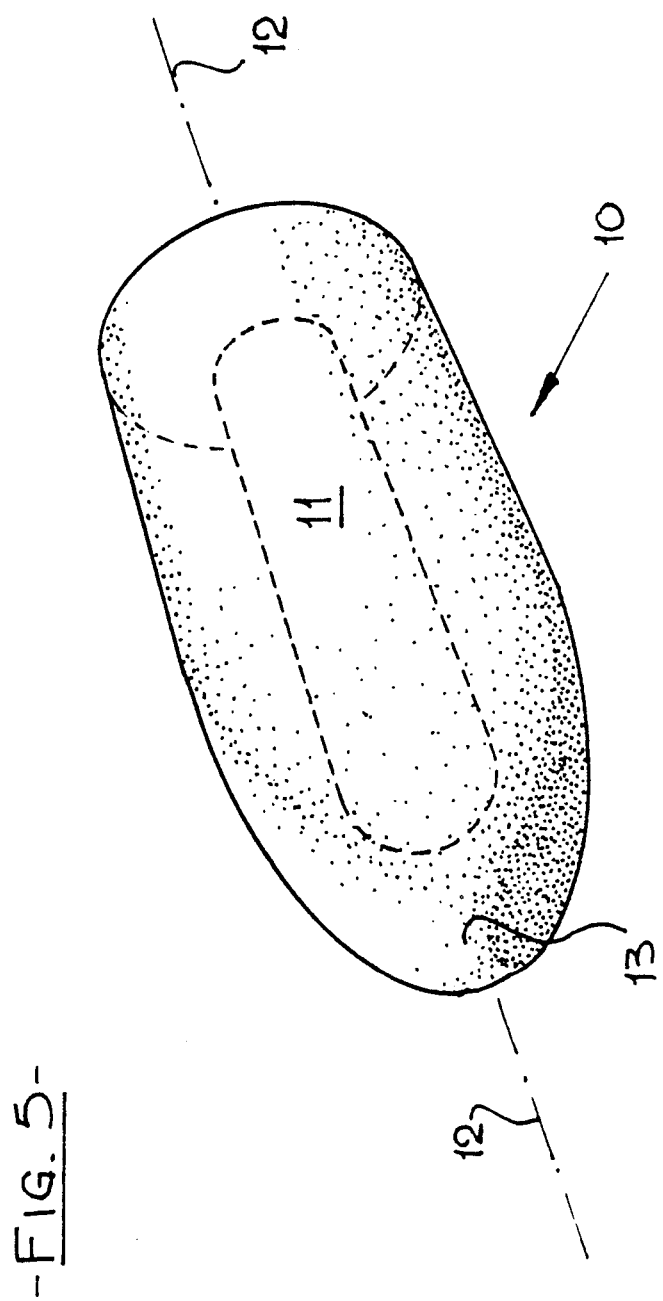
FIG. 5 is a perspective view of the bread roll shown in FIGS. 1, 2 and 3.

FIGS. 1, 2 and 3 illustrate an inventive bread roll, generally referenced 10, having an elongate cavity 11 extending partially along its longitudinal axis 12. End 13 of bread 10, located beneath the closed end of cavity 11, thus has a greater thickness of dough and is able to be "super-baked", that is to say, baked to an extent greater than the remainder of the bread roll to thus form a crusty bottom end adapted to absorb and retain flavourings and/or sauces such as tomato sauce, barbecue sauce, chili sauce, tabasco, satay sauce, mustard, horseradish sauce and the like, thereby preventing the sauces from dripping or squirting out of the bottom end of the bread roll, to the detriment of the consumer and of the surrounding area.

The top end of bread roll 10 is formed with a well or depression 14, concentric with cavity 11, perhaps 10 mm in depth and well adapted to act as a reservoir for the sauce; the outer peripheral edges of the top are preferably rounded. As will be appreciated, the "super-baked" end, being the recipient for excess sauce, will either provide a flavoursome final mouthful or can be thrown away if not wanted by the purchaser. Such a bread roll, when filled, will be able to be vended unwrapped at the point of sale, or used by a caterer to provide a display of such products at a function or the like.

The crusty end of the bread roll is not uniformly concentric with the centre elongate cavity of symmetric about the periphery of it; as will be seen from FIGS. 2 and 3 of the drawings, the lower end presents a different cross-sectional profile at sections 90° to each other. This gives a different thickness at different points, the better to allow over-baking at the thinner points to thereby provide the crusty end.

FIG. 4 is a vertical cross-section through a baking appliance suitable for the baking of molded, crusty-ended bread rolls. Cast or spun metal cups, or female molds, as that referenced 15, are spaced apart in a tray 16 and fitting over this is a cover or top tray 17 provided with an equal number of metal lances or spikes 18 for the purpose of making the elongate cavities. The cover 17 may have annular shoulders, as that referenced 19, to produce the wells or depressions 14 in the top ends of the rolls.

When a cup or female mold 15 is filled with a suitable charge of dough mix and a spike 18 inserted, some dough mix will intrude into the hollow interior of the spike through the holes 20. The assembled baking appliance, charged with dough mix is placed in an oven to bake the rolls and during this process the dough mix expands to further intrude into the interiors of the spikes.

After baking, the top tray 17 is removed and the rolls come away from the female mold 15, adhering to the spikes 18 by virtue of the previously mentioned intrusions, the interiors of the molds, and the spikes, having either been greased or coated with a non-stick culinary coating composition. Finally, the baked cavitied rolls are simply "knocked off" their spikes.

The appearance of foods is of considerable importance and in this instance a suitable size for the inventive cavitied rolls may well be, say, about 175 mm in length and about 65 mm in diameter, the cavity having a length of about 145 mm and a diameter of about 25 mm. The baked rolls, in addition to their crusty ends, will generally also be slightly crusty on the wall of the cavity.

It is envisaged that bread rolls made in accordance with the present invention will be equally suitable for sweet fillings such as, for example, frozen yoghurt or frozen fruit sticks, cream, jam, ice-cream, custard or the like. In this regard the bread rolls may be produced from a sweetened dough mixture, or alternatively, rolls produced from unsweetened dough mixtures can be coated —such as by spraying or dip-immersion—with a sweetening substance prior to reheating.

An example of a suitable dough mixture for use in manufacturing bread rolls according to the invention is set out below:
  550 g plain flour
  30 g compressed yeast
  90 g margarine
  120 g castor sugar
  250 g warm water
  60 g powdered milk
  60 g powered egg
  0.5 g salt
  0.5 g mixed spice.

The above ingredients were blended in accordance with normal bread making procedures. The bulk dough was then proved for 90 minutes at 30° C. The dough mixture was then dissected into 12 portions and placed into separate molds and allowed to provide for a further 30 minutes, prior to baking at 200° C. for 20 minutes. The molds were then taken out of the oven and the bottom or female portions of the molds were removed, followed by removal of the rolls from the mold spikes.

From the abovegoing it will be readily appreciated by those skilled in the art that numerous variations and modifications may be made to the invention without departing from the spirit and scope thereof as set out in the following claims.

I claim:

1. A baking appliance comprising a lower tray having therein a plurality of spaced-apart female molds, and co-acting top tray provided with an equal plurality of hollow spikes each one of which is adapted to extend downwardly into said mold to thereby produce an elongated cavity in a bread roll baked in the said appliance:

wherein the distance between the lower end of each spike and the lower end of an associated female mold is greater than the distance between the interior wall of the mold and the outer wall of the spike, and in that first longitudinal cross-section of said female mold is rounded at the closed end thereof and a second longitudinal cross-section, in a plane normal to said first longitudinal cross-section, is substantially conical at the said closed end.

2. The baking appliance as claimed in claim 1, wherein said female molds are constituted by cast metal cups.

3. The baking appliance as claimed in claim 1, wherein said female molds are constituted by spun metal cups.

4. The baking appliance as claimed in claim 1, wherein said top tray has, surrounding each spike, an annular shoulder adapted to form a depression in the top end of each bread roll.

5. The baking appliance as claimed in claim 1, wherein each said spike is provided with a number of holes so as to allow dough mix to intrude into the interior thereof.

6. A baking appliance comprising a lower tray having therein a plurality of spaced-apart female molds in the form of metal cups, and a co-acting top tray provided with an equal plurality of hollow spikes each one of which is adapted to extend downwardly into a said mold to thereby produce an elongated cavity in a bread roll baked in the said appliance, there being an annular shoulder surrounding each spike and adapted to form a depression in the top end of each bread roll, each spike further being provided with a number of holes so as to allow dough mix to intrude into the interior thereof:

wherein the distance between the lower end of each spike and the lower end of an associated female mold is greater than the distance between the interior walls of the mold and the outer wall of the spike, in that a first longitudinal cross-section of said female mold is rounded at the closed end thereof and in that a second longitudinal cross-section, in a plane normal to that of said first longitudinal cross-section, is substantially conical at the said closed end.

* * * * *

UNITED STATES PATENT AND TRADEMARK OFFICE
CERTIFICATE OF CORRECTION

PATENT NO. : 5,000,084

DATED : March 10, 1991

INVENTOR(S) : GRAEME I. K. Walliker

It is certified that error appears in the above-indentified patent and that said Letters Patent is hereby corrected as shown below:

At column 1, line 26, delete the word "produce" and insert therefor --product--.

At column 1, line 32, delete the word "descrete" and insert therefor --discrete--.

At column 1, line 64, after the word 'baked' insert therewith --bread--.

At column 2, line 4, delete the word "will" and insert therefor --well--.

At column 2, line 29, delete the word "plane" and insert therefor --plan--.

At column 3, line 2, delete the word "of" and insert therefor --or--.

UNITED STATES PATENT AND TRADEMARK OFFICE
CERTIFICATE OF CORRECTION

PATENT NO. : 5,000,084
DATED : March 10, 1991
INVENTOR(S) : GRAME I. K. Walliker It is certified that error appears in the above-indentified patent and that said Letters Patent is hereby corrected as shown below:

At column 3, line 28, delete the word "mold and insert therefor --molds--.

At column 3, line 53, delete the numeral "550" and insert therefor --500--.

At column 4, line 2, delete the word "provide" and insert therefor --prove--.

IN THE CLAIMS

In claim 1, column 4, line 23, before the word 'first' insert therewith --a--.

Signed and Sealed this

Twenty-eighth Day of December, 1993

BRUCE LEHMAN

Attest:

Attesting Officer

Commissioner of Patents and Trademarks